E. WILLIAMS.
STARTING DEVICE FOR GAS ENGINES.
APPLICATION FILED AUG. 26, 1911.
1,039,237.
Patented Sept. 24, 1912.
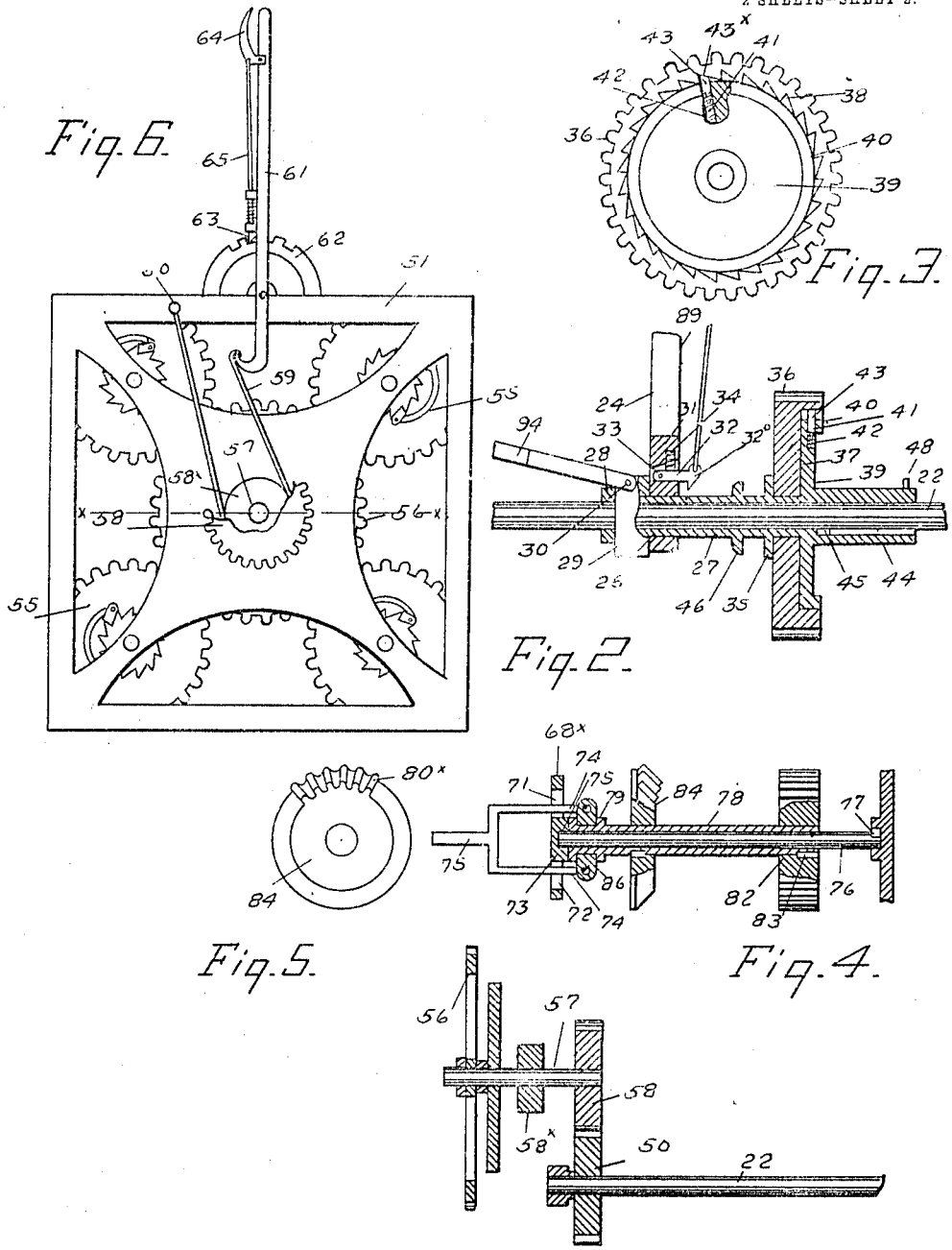

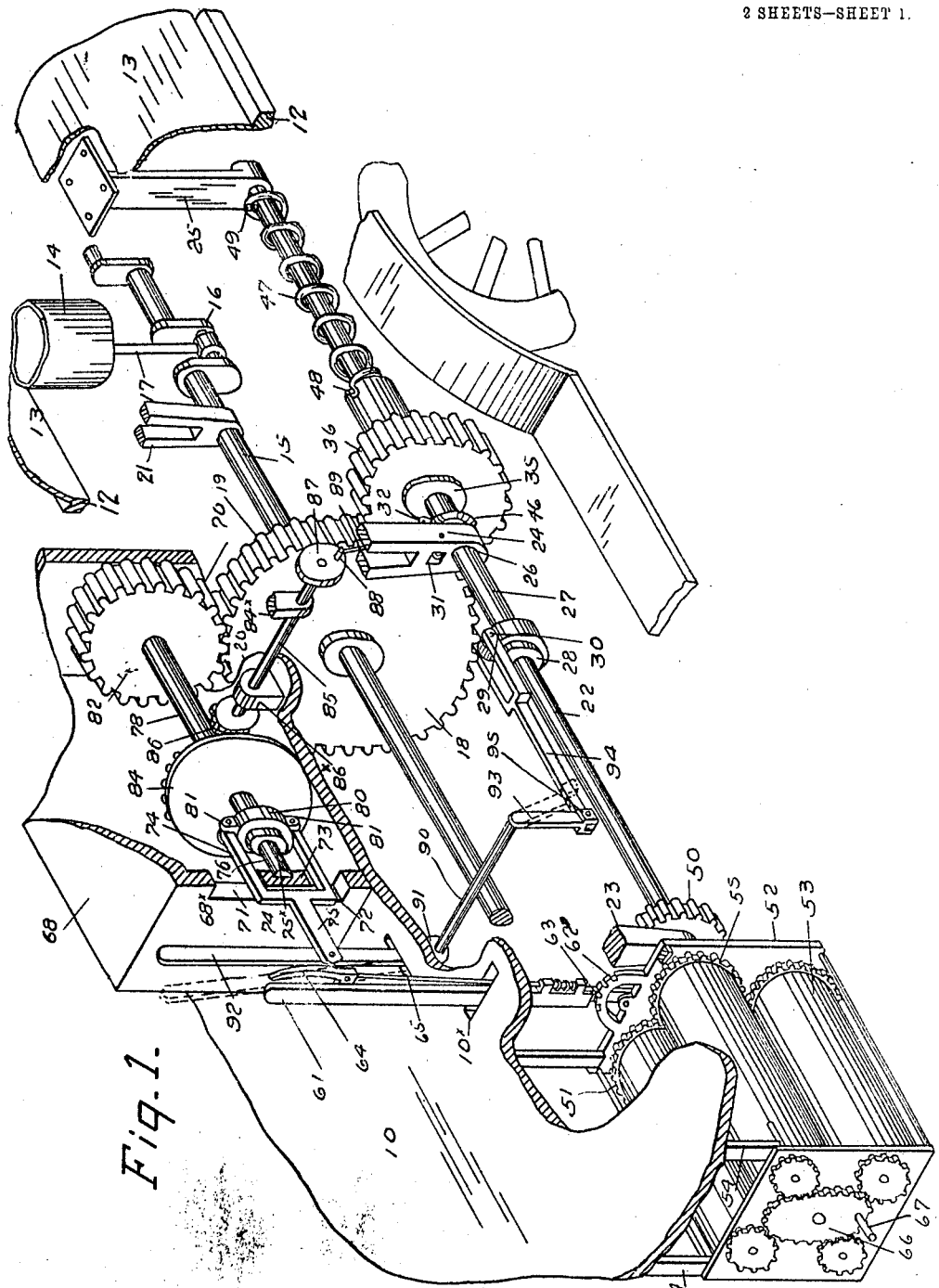

UNITED STATES PATENT OFFICE.

ELLIOTT WILLIAMS, OF KANSAS CITY, MISSOURI.

STARTING DEVICE FOR GAS-ENGINES.

1,039,237.   Specification of Letters Patent.   Patented Sept. 24, 1912.

Application filed August 26, 1911. Serial No. 646,147.

*To all whom it may concern:*

Be it known that I, ELLIOTT WILLIAMS, a citizen of the United States, residing at Kansas City, in the county of Jackson and State of Missouri, have invented certain new and useful Improvements in Starting Devices for Gas-Engines; and I do hereby declare that the following is a full, clear, and exact description of the invention, such as will enable others to make and use the same, reference being had to the accompanying drawings, forming a part of this specification.

The primary object of the invention is to dispense with the ordinary laborious and dangerous initiatory means of rotating the driving shaft, or cranking a gas engine in motor vehicles, and accomplish the cranking movement of the shaft in a positive manner while seated in the vehicle. Second, to communicate an intermittent movement of a motor to the fly wheel of an engine. Third, to automatically control the intermittent movement of co-acting, rotary shafts; and fourth, to provide for reverse movements of an engine in a driven shaft, originating from back firing upon a shaft-reversing power stroke.

The invention consists in the novel construction and combination of parts, such as will be first fully described and then specifically pointed out in the claims.

In the drawings: Figure 1. is a view in perspective, of a broken portion of the flooring of the body of a motor vehicle, showing one of the engines, the main driving crank shaft and fly wheel, and the novel power-operated mechanism for imparting initiatory rotary movements to the fly wheel and shaft. Fig. 2. is a detail view of the motor-operated, rotary shaft, showing the combined fixed and loose gear and ratchet wheels, respectively, and the splined spring-retracting sleeve, in section, the automatically-operated catch for retaining the loosely mounted gear wheel in mesh with the fly wheel. Fig. 3. is a detail, rear, side view of the combined gear and ratchet wheel on the motor operated shaft. Fig. 4. is a longitudinal, sectional view of the catch-releasing devices, inclosed within the boxing on the flooring of the body of the vehicle, the mutilated gear wheel being shown partially broken away. Fig. 5. is a detailed, side view of the mutilated gear wheel. Fig. 6. is a rear end view, in elevation, of the spring motor, showing the power-transmitting shaft and gear. Fig. 7. is a cross-sectional view of the rear end of the motor frame, showing the power-transmitting shaft and gear, and a portion of the motor-operated shaft and the gear shown in mesh with the power-transmitting gear on the motor shaft.

Similar numerals of reference indicate corresponding parts in all the figures of the drawings.

Referring to the drawings, 10 indicates the flooring of the body of a motor vehicle. 12 indicates the forward end of the body, and 13 the hood inclosing the engine, both of which parts are shown broken away.

14 indicates the engine, one cylinder only being shown of the number usually employed, which is sufficient to illustrate the invention.

15 indicates the main driving or rotary crank shaft, the crank 16 being connected with the piston rod 17, of the engine. The crank shaft 15 extends rearwardly, and operates the rear wheels of the vehicle in the usual well known manner, which is for the purposes of the invention not necessary to illustrate.

Upon the crank shaft 15 is fixedly secured a large fly wheel 18, upon the periphery of which wheel are gear teeth 19, the circumference of which wheel is made to extend through an opening 20, in the flooring 10, of the car, and a slight distance above the upper surface of said flooring, for the purpose further described. The shaft 15 is supported the usual distance below the body of the vehicle in the shaft hanger 21.

Parallel with the crank shaft 15, and as shown upon the right-hand side of the body of the vehicle is a motor-operated line-shaft 22, supported at its ends in the hangers 23 and 25, respectively, the former being connected with the lower surface of the flooring 10, and the latter with the hood 13.

A shaft hanger 24 is connected with the lower surface of the flooring 10, above shaft 22, at a point a short distance in rear of the line of the periphery of fly wheel 18, the opening 26, in the lower end of which hanger is larger in circumference than the shaft 22, the shaft 22 passing through said shaft opening 26. Upon said shaft 22 is slidingly mounted a sleeve 27, the rear end portion of which sleeve extends loosely within the shaft opening 26, in the hanger 24, and freely slides therein. Upon the rear end of said sleeve is an outwardly-extended, annular flange 28, and within said flange and loosely mounted on the sleeve 27 is a collar 29 (see Fig. 2), upon the sides of which collar are outwardly-extended pins 30.

In the lower portion of the hanger 24, directly above the shaft opening 26, is a transverse opening 31, formed in the casting. In this opening is pivoted a hook or catch 32, which bears normally on the lower surface of said opening, its rear end being connected with the pivot 33, extending through the hanger and said opening. A coiled spring 34 is arranged in the opening 31, a slight distance forward of a vertical line extending through the pivot 33, the upper end of which spring bears upon the upper surface of the opening 31 and its lower end on the upper surface of hook 32.

As seen in Fig. 2, the sleeve 27 is at the end of its sliding movement, thus bringing the collar 29 in contact with the rear surface of the hanger 24, the portion of said sleeve carrying said collar and the portion within the opening 26 being approximately one-fourth of the full length of sleeve 27, and at a point on said sleeve equidistant from its ends is a fixed annular flange 35. Upon said sleeve 27 is loosely mounted a gear wheel 36, which as shown is approximately one-fourth the circumference of the fly wheel 18, the rear surface of which gear wheel 36 is positioned in close contact with the forward surface of the flange 35. In the forward surface of the gear wheel 36 is a recess 37, approximately one-third of the width of the periphery of the wheel, the side of said recess being concentric with and a slight distance inwardly from the peripheral portion of the gear wheel carrying the gear teeth. Upon the said concentric portion of recess 37 are ratchet teeth 38. (See Fig. 3). Within the recess 37, of one gear wheel 36, is a wheel 39, its peripheral portion 40 extending to the line of the ratchet teeth 38, and approximately of the same width as said ratchet teeth 38. In the peripheral portion 40, of the wheel 39, is recess 41, extending inwardly a short distance and in the direction of the longitudinal axis of shaft 22. In the lower portion of the recess 41 is a coiled spring 42, and bearing upon the outer end portion of said spring is a catch bolt 43, having a beveled outer end 43$^x$, which acts to engage positively with the ratchet teeth 38, in a right-hand movement of the wheel 39, and yields to the left-hand movement of the gear wheel 36, in which movement the catch bolt 43 compresses the spring 42, in the non-engaging movement of the ratchet teeth.

As shown in the drawing, the hub of the wheel 39 forms an integral part of the sleeve 27, and in said portion of the sleeve 27 is a groove 44, extending to the forward end of said sleeve. In the shaft 22, within the groove 44, is a fixed spline or key 45, which permits the sliding movement of the sleeve on shaft 22, while rotating in unison therewith. Upon the sleeve 27, a short distance in rear of flange 35, is an annular flange 46, which comes into contact with the forward surface of the shaft hanger 24, in the sliding movement forwardly of sleeve 27, and which brings the gear wheel 36 in mesh with the fly wheel 18. The peripheral portion of flange 46 is inclined or beveled, and in the forward movement of the sleeve 27 contacts with the inclined face 32°, of hook 32, raising said hook, the latter engaging with the said flange 46. Upon the forward end of the rotary shaft 22 is a coiled retracting spring 47, the coils of which spring are extended concentrically with the shaft. The forward end of the said spring is connected with an eye 48, on the rear end of the sliding sleeve, and the rear end of said spring is connected with a pin 49, on the forward end of the shaft 22. Upon the rear end portion of shaft 22 is fixedly mounted a gear wheel 50, which is smaller in circumference than gear wheel 36.

51 indicates a motor actuating the shaft 22. This preferred motor as shown consists of a motor frame 52, in which are multiple winding springs 53, the frame 51 being supported beneath the flooring 10, in rear of the hanger 23, by the supporting straps 54, secured to the upper portion of the frame 51, and the lower surface of the flooring 10. The ordinary ratchet wheels 55, of the motor, communicate rotary movement to the gear wheel 56, on the rotary transmission shaft 57, on said motor, upon which shaft is a gear wheel 58, which meshes with the gear wheel 50, on the shaft 22, as seen in Fig. 7.

On shaft 57 is a band wheel 58$^x$, and around said wheel extends a brake band 59, secured at 60 at one end to the motor frame, and at the other end to the lower arm of a brake operating, pivoted lever 61. On the frame 51 is a toothed segment 62, engaged by the detent 63, on the operating lever. Upon the upper end of the lever 61, which extends upwardly through a transverse opening 10$^x$, in the floor 10, is a pivoted hand lever 64, operatively connected with the detent 63, by a wire or rod 65, in the usual manner. The power to operate the shaft 22 is stored in the motor springs by means of a uniform winding wheel 66, operated by the handle 67, this feature being the subject of another application, and not necessary to further describe.

Upon the upper surface of the flooring 10, above the fly wheel 18, is secured fixedly a rectangular-shaped box 68 (see Fig. 1), in the bottom 69 of which box is an opening 70, registering with the opening 20, in the flooring, and through which the peripheral portion of the fly wheel 18 extends.

In the rear end 68$^x$, of the box 68 are vertical slots 71 and 72, separated by a portion 73, of the end of the box, within which openings extend the forked ends 74, of a sliding lever 75. In the portion 73, of the box between the slot 71 and 72 is a depression 75°, in which is extended the rear end of a non-rotating shaft 76, the other or forward end being keyed within a like depression 77, in the forward end of box 68. Upon shaft 76 is a rotatable sleeve 78, upon the forward end of which sleeve is a circumferentially grooved neck 79, in the groove of which neck is a loosely-connected collar 80 (see Fig. 4), upon the outer surface of which collars are lugs 81, with which lugs are pivotally connected the forked ends 74, of the sliding lever 75. The sleeve 78 is about two-thirds the length of shaft 76, and in the position as seen in Fig. 2, when moved forward in contact with the rear end of the box 68, its forward end is forward of a vertical line extending through the fly wheel 18. Upon said forward end of sleeve 78 is a gear wheel 82, slightly smaller in circumference than the gear wheel 36, the gear 82 being secured fixedly to the sleeve by the key 83. This gear wheel 82, as seen in Fig. 1, is in mesh with the fly wheel 18, and in Fig. 4 moved with the sleeve rearwardly, out of mesh with said fly wheel. Upon the sleeve 78 is fixedly secured at a point a short distance forward of the grooved neck 79, a mutilated, beveled gear wheel 84, approximately the circumference of gear wheel 82.

Extending at right angles to the sleeve 78, is a rotary shaft 85, upon the inner end of which shaft, within the box 68 is a bevel pinion 86. This shaft 85 is located in position, and journaled at its inner end within the journal box 86$^x$, secured to the upper surface and bottom of the box 68, about equi-distant from its forward and rear ends, the bevel pinion 86 being in the path of movement of the mutilated gear when the sleeve 78 moves forwardly, to cause engagement of the mutilated gear with the pinion 85, at which time the gear wheel 82 is in mesh with the fly wheel.

The outer end of the rotary shaft 85 is supported in a shaft hanger 84$^x$, connected with the top of the box 68. The outer end of said shaft 85 extends in the direction of the right-hand side of the said box 68, shown broken away and also through said side to a position approximately above the spring-controlled hook 32, and upon said end of shaft 85 is a small wheel 87. Upon the face of the wheel, near the periphery is a pin 88, with which pin is pivotally connected the upper end of a wire, or rod 89, the lower end being connected pivotally with the outer end of the hook 32.

90 indicates a rock shaft, journaled in the journal box 91, on the lower surface of the flooring 10, at a point a short distance in rear of a vertical line passing through the rear end of box 68. With the inner end of shaft 90 is rigidly connected the lower end of an operating lever 92, the upper end of said lever extending upwardly through a longitudinal slot 10°, in the flooring 10, immediately in rear of a vertical line passing through the sliding lever 75, operating sleeve 78, with the right hand side of which lever the outer end of lever 75 is pivotally connected, as at 75$^x$. The other end of shaft 90 extends above driving shaft 15 beneath the flooring 10, to a position above the motor operated shaft 22, and upon said end is a crank 93, extending downwardly a suitable distance toward shaft 22, and with the lower end of said shaft is pivotally connected the rear end of a lever or bar 94, the forward end being forked at 95, and said forked ends connected with the pins 30, on the collar 29, on the sliding sleeve 78, on the rotary shaft 22.

In operation the motive power is first stored in the motor 51, as seen by the operation of the winding wheel 66. The motor vehicle being in readiness for an incipient fly wheel movement, a forward movement is communicated by the hand or foot to the lever 92, and said lever moved from its dotted position in Fig. 1, to the position seen in full lines, thereby moving the sleeve 78, on shaft 76, in the box 68 forwardly, thus bringing the surface of the mutilated gear wheel 84, from which the gear teeth are removed opposite the pinion 86, and the gear 82 in mesh with the fly wheel 18. Simultaneous with the forward movement of the lever 92 the crank arm 93, on the rock shaft 90, moves in the arc of a circle from its forward position seen in dotted lines Fig. 1, to its rearward position, thereby moving the sliding sleeve 27, on the rotary shaft 22, rearwardly to a position in which the key 45, in the groove 44, in sleeve 47, is nearly at the outer end of said groove, in which movement the spring 47, on shaft 22 is extended in length, the inclined surface of the flange 46, raises the lock or catch 32 upwardly, and falls in contact with the rear surface of said flange, thereby retaining the sleeve 27 in its rearward position the action of the spring 31 controlling the hook 32, serving to draw upon the rod 89 and move the upper end of said rod with the pivot 88, on wheel 87, at the lower point in the circle of rotation of said wheel. In this rearward movement of sleeve 27, the gear wheel 36 is in mesh with the fly wheel 18, as seen in Fig. 1. The operating lever 61, to the motor 51, is now seized by the hand, the detent released from the notched segment plate 62, by the grasp upon the hand lever 64, and sufficient release given to the brake band 59 to permit the winding springs 53 in rewinding to communicate motion to the power transmitting shaft 57, carrying the gear 58, which gear imparts a right-hand, rotative movement to the motor-operated shaft 22, and the gear wheel 36, on said shaft, and a left-hand, rotative movement to the fly wheel 18. A limited number of revolutions of the power transmission shaft 57, on the motor only being required to impart a limited number of revolutions to the fly wheel 18, consequent upon which the crank 16, in the main power shaft 15, operates the piston rod 17, and upon the completion of the cycle movements of all the engines, the motion of shaft 15 is continuous and the lever 61 is caused to increase the tension on the brake band 59, on the motor, and the action of motor 51 ceases. During the rotative movement of the main shaft 15 a rotative movement is imparted to the gear wheel 82, at a slow degree of speed, and this movement continues until such time that the toothed portion 84°, of the mutilated gear engages the pinion 86, on the shaft 85, and a slow movement is imparted to the shaft 85, which action moves the pin 88, on the wheel 87 in an arc of a circle, drawing upwardly thereby on the rod 89, and releasing the hook or catch 32. The spring 47, on shaft 22, which has been under high tension, now retracts under its retractive force drawing the sleeve 27 forwardly into its former position and moving the gear 36 out of mesh with the fly wheel. At the same time the retractive force of spring 47 draws the crank 93 on the crank shaft 90 into its forward position, and lever 92 draws rearwardly the sleeve 78, disengaging thereby gear wheel 82 from the fly wheel 19, these movements following automatically the retraction of the said spring 47.

The motor vehicle upon the movement of the application of the power of the engine to the crank shaft may at once be set in motion, the mechanism described for its initial movement self-acting to disengage the gear in mesh with the fly wheel. Frequently the action of the mechanism to impart the described initial movements to energize, or rotate the crank shaft 15 results in an instant counter-action of the piston from premature explosions toward back firing, thus a rotation is imparted partially, or wholly, in a right-hand movement of the fly wheel. Should the gear wheels 36 and 82 be in mesh with the fly wheel, a left hand, rotative movement is comunicated to the loose gear wheel 36, on sleeve 27, which turns in a left hand direction of movement faster than the wheel 37, the spring bolt 43 permitting the ratchet teeth 30 to pass without retarding the movement of the wheel. In this movement very slight action takes place in the sleeve 78, in box 68, for the reason that after any action of the mutilated gear to actuate shaft 85 to move the wheel 87, in a movement to release the hook or catch 32, the gear portion, of the gear wheel 84, is at a remote distance from the beveled pinion 86, consequently the smooth portion of the mutilated gear wheel moves past the pinion 86, without any action.

It is obvious that the action of the motor 51 may be caused to impart power to shaft 22, at any speed, and the operation of the lever 92 be moved with a degree of caution, in order to anticipate back-firing, in which movement the hand is employed instead of the foot, to operate the lever 92. I have shown a spring motor 51, as the source of power for operating shaft 22, but other kinds of power may be employed, if so desired.

The invention is applicable to other uses besides that of starting the fly wheel of an engine. While the invention may also control fly wheels of caloric engines, an automatic power transmission may be as effectively combined, and such other modifications employed as are within the scope of the appended claims.

Having fully described my invention, what I now claim as new, and desire to secure by Letters Patent is:

1. In a mechanism for imparting a starting movement to gas engines, a motor, and a rotary power shaft actuated thereby, a sliding sleeve keyed on said shaft, and a gear wheel loosely mounted on said sleeve having a recess, and ratchet teeth in the side of said recess concentric with the gear teeth and the periphery of said wheel, a fixed wheel on said sleeve, and a spring bolt adapted to engage with the ratchet teeth.

2. In a mechanism for imparting a rotary movement to gas engines, a motor, and a rotary shaft actuated thereby, a suitable guide support for said shaft, a sliding sleeve keyed on said shaft, self-engaging means on said support engaging with said sleeve, and a retracting spring on said shaft connected with said shaft and sleeve.

3. In a mechanism for imparting a starting movement to gas engines, a motor, and a rotary shaft actuated thereby, a suitable guide support on said shaft, and a catch on said support, a loose and a fixed wheel on said sleeve, and interlocking means for the fixed and loose wheels for rotation in one direction in unison, means for retracting said sleeve, and means on the sleeve engaging with the catch on the support on said shaft.

4. A mechanism for imparting a starting movement to gas engines comprising the main rotary driving shaft of the engine and its fly wheel, an auxiliary rotary power shaft and a shaft support a motor actuating said auxiliary rotary shaft, a fixed gear wheel on the main power shaft and a sliding sleeve on the auxiliary rotary shaft keyed on said shaft a gear wheel on said sleeve movable in gear with the gear wheel on the main driving shaft a catch on the support for the auxiliary rotary shaft engaging devices on said sleeve engaging with said catch a lever acting to move the sliding sleeve rearwardly into engagement with the said catch, a sleeve retracting spring, and a catch releasing device to which movement is imparted from the fly wheel on the main power shaft upon the completion of a number of initial revolutions thereof.

5. The combination with a gas engine and a main rotary driving shaft, and the fly wheel on said shaft provided with gear teeth upon its periphery, of starting mechanism consisting of an auxiliary rotary power shaft, and a guide support through which said shaft extends adjacent the fly wheel, a motor actuating the auxiliary shaft, a sliding gear wheel keyed on the latter shaft, a catch on the said support for releasably holding the gear wheel in mesh with the fly wheel, and a retracting spring on said auxiliary shaft for moving said sliding gear wheel out of mesh with the fly wheel, a train of gears actuated by the fly wheel, and a rotary wheel actuated by the train of gear, and a releasing device carried by the rotary wheel for releasing said catch.

6. In starting mechanism for gas engines, the combination with the engine and the main driving shaft, and fly wheel, of an auxiliary rotary power shaft, and a motor actuating said shaft, means for transmitting rotary motion from the auxiliary shaft to the fly wheel, and means actuated by the fly wheel for controlling the number of revolutions imparted by the auxiliary shaft to the fly wheel.

7. In starting mechanism for gas engines, the combination with the engine, the main driving rotary shaft, and fly wheel having gear teeth, of an auxiliary rotary shaft, and a motor actuating said shaft, a spring retracted sliding gear wheel keyed on the latter shaft, a releasable catch securing said gear wheel in mesh with the fly wheel, and retracting means for moving said gear wheel out of mesh with the fly wheel, means controlled by the fly wheel for controlling the number of revolutions imparted by the sliding gear wheel on the auxiliary shaft to said fly wheel and co-acting to release the catch holding said sliding gear in mesh with the fly wheel.

8. In starting mechanism for gas engines, the combination with the engine and main driving shaft, and fly wheel provided with gear teeth, of an auxiliary rotary shaft, a suitable guide support thereon, a motor actuating said shaft, a sliding gear wheel on said shaft, a coiled spring on said shaft for moving said gear wheel out of mesh with the fly wheel a catch on the guide support, releasably holding the sliding gear wheel from movement out of mesh with the fly wheel, a rotary shaft, a pinion at one end, and a wheel at the other end located above said catch, connecting devices connecting said wheel with said catch, and means co-acting with the fly wheel for imparting motion to said pinion and release said catch.

9. In starting mechanism for gas engines, the combination with the engine and main driving shaft and fly wheel, of a motor, an auxiliary rotary shaft, actuated by the motor, power-transmitting means on said shaft for transmitting power from said shaft to the fly wheel, a rock shaft, and a lever on the rock shaft, and an arm on said shaft, a train of gear wheels movable in gear with the fly wheel for controlling the number of revolutions of the fly wheel imparted by the motor on the auxiliary shaft, and means controlled by the rock shaft and lever and lever arm for moving simultaneously the train of gear and the sliding power-transmitting means in power connection with the fly wheel.

10. In a starting mechanism for gas engines, the combination with the engine, the main driving rotary shaft and fly wheel provided with gear teeth, of an auxiliary rotary power shaft, a motor actuating said shaft, a sliding sleeve keyed on said shaft, a gear wheel on said sleeve adapted to mesh with the fly wheel, a train of gear wheels including a mutilated gear wheel and pinion for controlling the number of revolutions of the mutilated gear wheel, the latter being movable in engagement with the fly wheel, a rock shaft, an operating lever thereon, and an arm operatively connected with the mutilated gear and also with the sliding gear wheel on the auxiliary shaft.

11. In starting mechanism for gas engines, the combination with the engine, the main driving shaft and fly wheel of a motor, of an auxiliary rotary shaft actuated by the motor, and power-transmitting means for transmitting rotary motion therefrom to the fly wheel, and a train of gear wheels controlled by the fly wheel for controlling the number of revolutions so transmitted.

12. In starting mechanism for gas engines, the combination with the engine, the main driving shaft, of an auxiliary rotary power shaft, a spring motor for communicating a number of initial revolutions to the auxiliary shaft, a gear wheel on the main shaft, a sliding gear wheel keyed on the auxiliary shaft, releasable securing means for securing the sliding gear wheel in mesh with the gear wheel on the main power shaft, and a wheel retracting spring for moving said wheel out of mesh, a train of speed-reducing gear wheels in operative connection with the gear wheel on the main shaft and also in operative connection with the securing means for the sliding gear wheel on the auxiliary motor-operated shaft.

13. In starting mechanism for gas engines, the combination with the engine, the main power rotary shaft, the fly wheel on said shaft having gear teeth, of an auxiliary shaft, a motor actuating said shaft, a sliding sleeve keyed on the latter shaft, a gear wheel thereon in mesh with the fly wheel, retracting means for the sliding of said sleeve into mesh with the fly wheel, a flange on said sleeve, a shaft support adjacent the fly wheel, a spring-controlled hook engaging with the flange on said sleeve, a train of gears including a fixed shaft, a sliding sleeve keyed on the shaft, a mutilated gear wheel, and a gear wheel meshing with the fly wheel, a separate rotary shaft in the train of gear wheels including a pinion adapted to be turned on its axis by the mutilated wheel, and a wheel carrying a rod pivotally connected therewith, and said hook engaging with the sleeve on the auxiliary shaft, a rock shaft, a lever on said shaft, an arm, connecting devices connected pivotally with said arm, and the sleeve on the auxiliary power shaft, and connecting means pivotally connected with the lever on the rock shaft, and the sleeve on the fixed shaft of the train of gears.

ELLIOTT WILLIAMS.

Witnesses:
FRANK A. PAYNE,
ANNIE L. GREER.